April 21, 1953     A. E. THURBER, JR     2,635,634
MULTIPLE VALVE

Filed Dec. 7, 1945     2 SHEETS—SHEET 1

Inventor
A. E. Thurber, Jr.
Barry & Cyr.
Attorneys

Patented Apr. 21, 1953

2,635,634

UNITED STATES PATENT OFFICE 2,635,634

MULTIPLE VALVE

Adolph E. Thurber, Jr., Brooklyn, N. Y.

Application December 7, 1945, Serial No. 633,462

3 Claims. (Cl. 137—653)

This invention relates to improvements in valves and more particularly to a variable flow, solenoid controlled multiple valve.

The primary object of the invention is to provide a multiple valve including a main valve for controlling the flow of a liquid in combination with auxiliary valves for controlling the discharge of a control fluid from the main valve structure so that it is possible to open the main valve to various extents.

With the foregoing object outlined and with other objects in view which will appear as the description proceeds, the invention consists in the novel features hereinafter described in detail, illustrated in the accompanying drawings, and more particularly pointed out in the appended claims.

Figure 2:
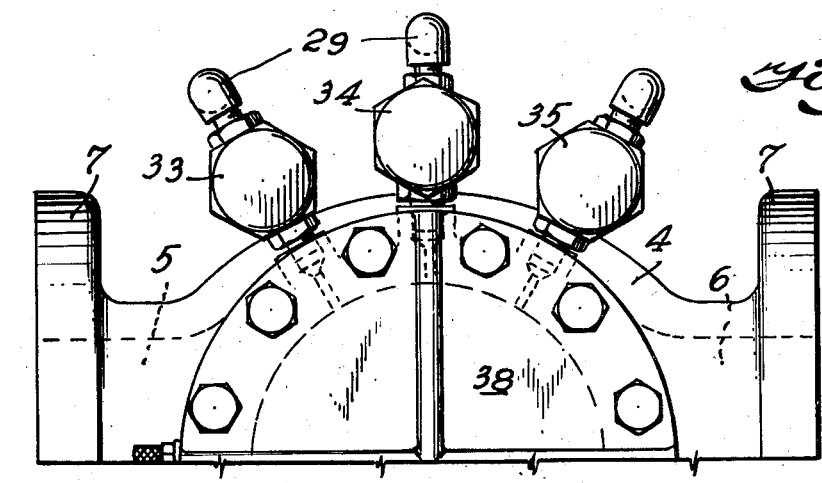
Fig. 2 is a top plan view of a half of such a valve.
Figure 1:
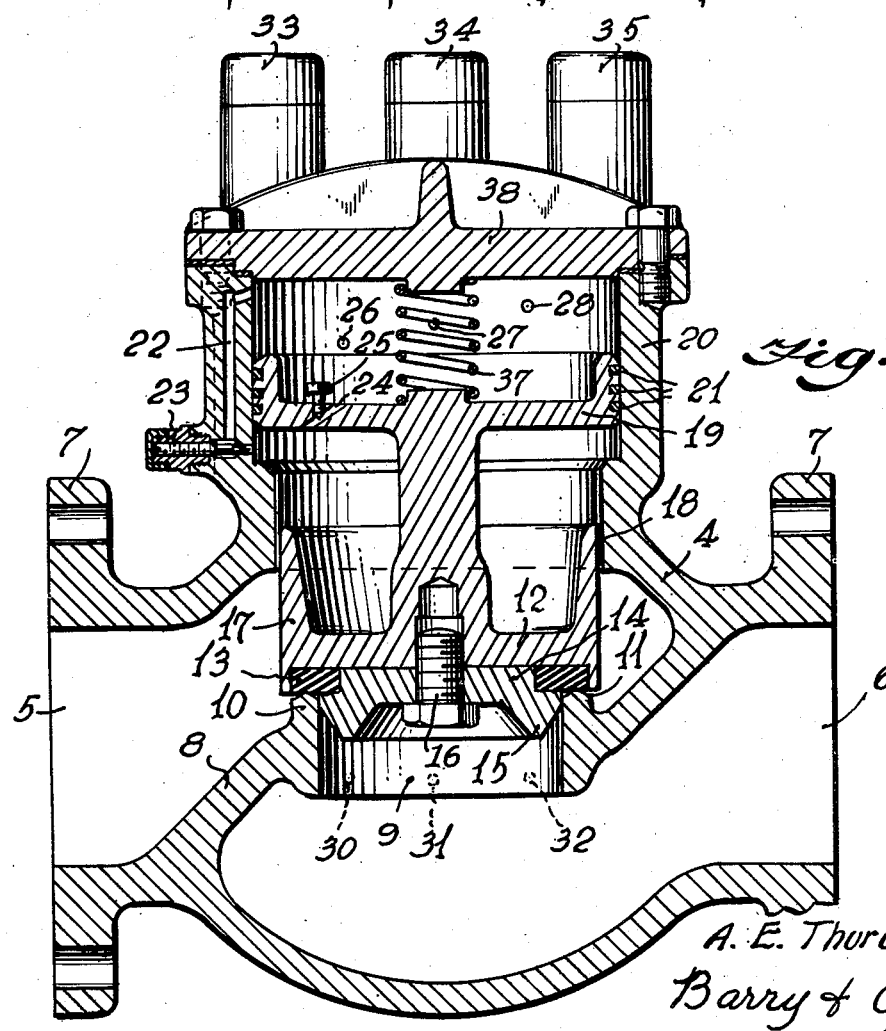
Fig. 1 is a longitudinal vertical sectional view of an example of a multiple valve in which the invention is embodied.
Figure 3:
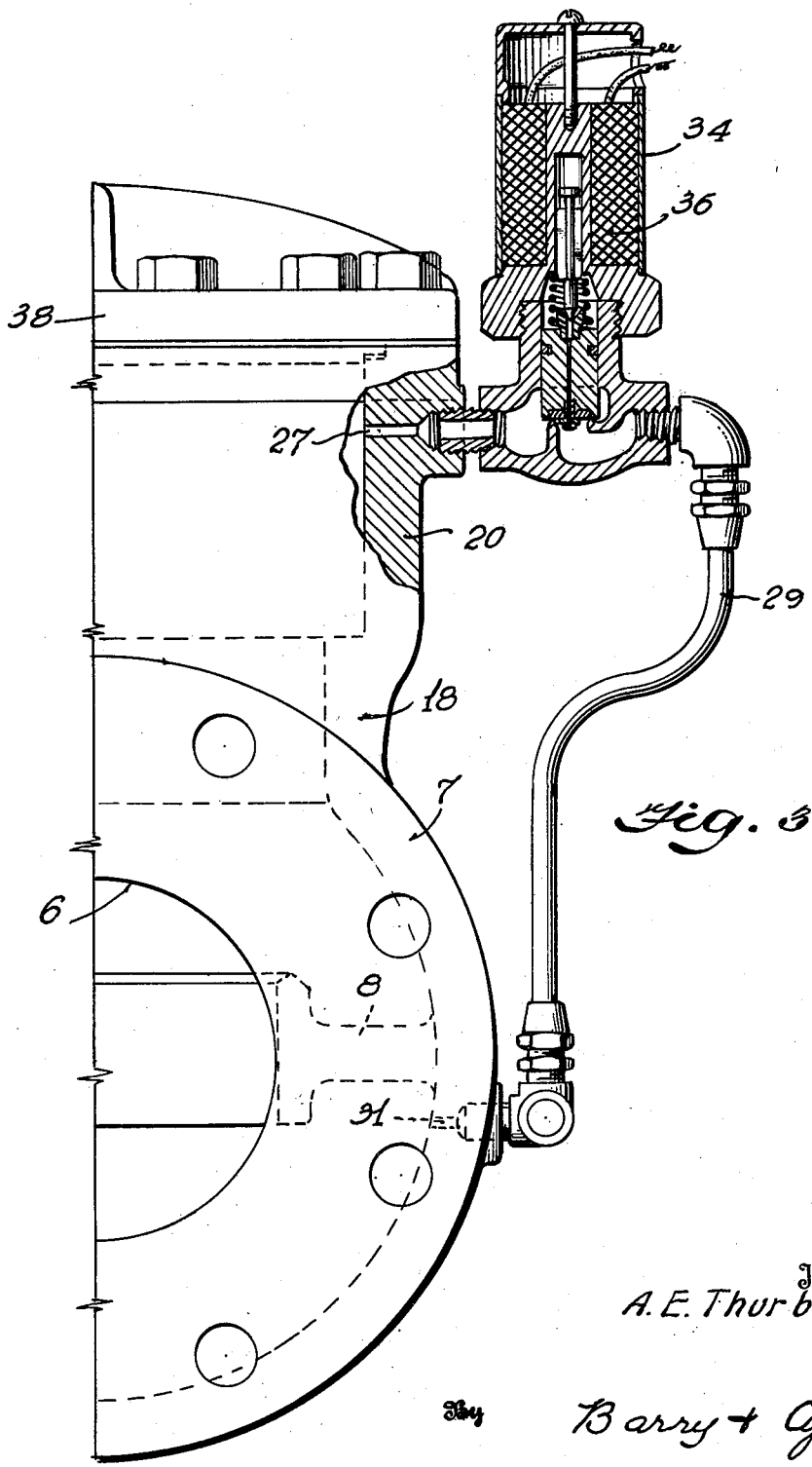
Fig. 3 is an end elevation of such half of the valve, partly in vertical section, and with some parts omitted to facilitate illustration.

Referring to the drawings, 4 designates a main valve casing having an inlet 5 and an outlet 6, each provided with any suitable means, such as an apertured flange 7, to facilitate the installation of the valve in a pipe line or the like.

The interior of the casing is divided by a partition 8 forming a vertically disposed port 9 surrounded at its upper end by an annular valve seat 10, terminating at its top in a tapered ridge 11.

A reciprocating head 12, forming the active member of the main valve, is provided with a gasket 13 which cooperates with the seat to prevent flow of fluid through port 9 when the head is seated, and the gasket is preferably held in place by a disc shield 14 provided with a depending tapered annular flange 15 of substantially triangular shape, to prevent water hammer. The shield is secured to the head by any suitable means, such as a screw 16.

The head has an upstanding annular flange 17, forming a small lower piston having a loose fit in a lower guide or cylinder 18, of an extension of the casing, so that fluid entering the inlet 5 may flow past the piston into the cylinder.

The central portion of the active member of the valve extends upwardly above the flange 17 and terminates in an upper piston 19, of larger diameter than the lower piston, and movable in an upper cylinder or guide 20, projecting from the valve casing. Piston rings 21 are provided on the periphery of the upper piston to prevent flow of fluid past that piston. In order to permit flow of fluid from the cylinder 18, above piston 17, into the cylinder 20 above the upper piston, a by-pass 22 may be provided in the extension of the valve casing and may be controlled by a manually operated needle valve 23 or the like. Instead of using the by-pass, I may extend a port 24 through the upper piston and control it by a screw-threaded needle valve 25.

The wall of the cylinder 20 is provided with a series of liquid outlets 26, 27 and 28, arranged at varying distances from the valve seat 10 so they may be successively closed by piston 19. These outlets are associated with by-pass pipes 29, leading respectively to discharge ports 30, 31 and 32, communicating with the outlet 6. Each by-pass pipe has interposed therein, an auxiliary or pilot valve, designated respectively 33, 34 and 35, and each auxiliary valve may be controlled by any suitable means, such as a solenoid 36. The pilot valves may be of the type disclosed in U. S. Patent 1,633,217, dated June 21, 1927.

Any suitable means for loading the valve head 12 may be employed for urging the same towards its seat. For example, a coil spring 37 may be interposed between the piston 19 and the removable bonnet 38 of the valve.

In operation, assuming that the valve head 12 is seated on the seat 10, and all the pilot valves 33, 34 and 35 are in closed position, if the circuit through the terminals of the solenoid of valve 33, for example, is closed, the water in the cylinder 20 above piston 19 will escape through the outlet 26 into the pilot valve 33, and thence through the port 30 after passing through the by-pass pipe 29 which connects 33 and 30. This will permit piston 19, under the influence of the pressure below it, to rise until the piston closes the outlet 26 to a point where the flow of fluid from by-pass 22 is equal to the flow through 26. Of course, the capacity for fluid flow through 26 is somewhat greater than past needle valve 23 or 25, which allows the fluid in the chamber above the piston 19 to escape through 26 and thus remove the pressure on the top of the valve head 12, and as the piston 19 is somewhat larger than the valve seat, the fluid pressure in the valve body will lift the head 12 from its seat so as to allow fluid to pass through the port 9 of the main valve. This flow will continue until the circuit through the terminals of the solenoid of valve 33 is interrupted, at which time the pilot valve 33 will stop flow through 26, the fluid continuing to flow into the chamber above the piston 19 until the pressure in such chamber will force the valve head 12 to its seat and thus stop flow through the main valve. As the valve head 12 moves toward its seat, the shield 14 will prevent water hammer. This same procedure is duplicated by closing and opening the circuits of the solenoids of pilot valves 34 and 35 to permit any desired flow through the main valve. It is just a matter of placing pilot valve ports in their proper positions on the upper portion of the valve casing to permit the desired flow from inlet 5 to outlet 6.

From the foregoing, it is believed the construction, operation and advantages of the multiple valve may be readily understood and I am aware that changes may be made in the details disclosed without departing from the spirit of the invention, as expressed in the following claims:

What I claim and desire to secure by Letters Patent is:

1. A normally closed valve adapted to be moved to a plurality of open positions comprising, a valve casing provided with an inlet and outlet, a partition within the casing obstructing the outlet from the inlet and having a passage therethrough, a valve head normally closing said passage, an actuating piston connected to said valve head, said casing and piston defining a pressure chamber, means providing a small passage between said pressure chamber and said inlet, said casing having a plurality of outlet openings therein in open communication with said pressure chamber, said outlet openings being spaced along a line of movement of said piston, said outlet openings being circumferentially spaced from each other, conduits in communication with each of said outlet openings extending into communication with said outlet of the valve, and a pilot valve mounted in each of said conduit means adjacent the outside of the casing for selectively opening the respective conduits.

2. A normally closed valve adapted to be moved to a plurality of selected open positions comprising, a valve casing provided with an inlet and outlet, a partition within the casing having a passage therethrough, a valve seat associated with said passage, a valve head normally engaging the valve seat and blocking movement of the liquid through said passage, a piston connected to the valve head, a cylinder forming a part of the casing guiding the piston and cooperating therewith to provide a closed pressure chamber, means providing a small passage from said inlet into communication with said pressure chamber, said cylinder having a series of outlet openings therein spaced from each other axially of the cylinder and at different distances from the valve seat, said outlet openings being circumferentially spaced from each other, and a plurality of pilot valves supported on the outside of the casing for selectively opening and closing said outlet openings.

3. A normally closed valve adapted to be moved to a plurality of open positions comprising, a valve casing provided with an inlet and outlet, means within the casing obstructing the outlet from the inlet and having a hole therethrough with a valve seat therearound, a valve head normally blocking movement of the liquid through the passage, a piston carried by the valve head, a cylinder on the casing for the piston and providing a closed pressure chamber, means establishing a small passage from said inlet into communication with said pressure chamber, said cylinder having a series of outlet openings spaced along the cylinder at different distances from the valve seat and circumferentially spaced from each other, each of said outlet openings being of a larger area than said passage, a valve for each outlet opening supported on the outside of the casing for selectively opening and closing said outlet openings, and a flange carried by the valve head partially obstructing said inlet.

ADOLPH E. THURBER, Jr.

References Cited in the file of this patent

UNITED STATES PATENTS

| Number | Name | Date |
|---|---|---|
| 870,000 | Watrons | Nov. 5, 1907 |
| 916,758 | Murphy | Mar. 30, 1909 |
| 1,027,818 | Collin | May 28, 1912 |
| 1,250,388 | Titus | Dec. 18, 1917 |
| 1,479,947 | Way | Jan. 8, 1924 |
| 1,571,396 | Darrow | Feb. 2, 1926 |
| 1,841,629 | Pigeolet | Jan. 19, 1932 |
| 2,107,200 | Kennon | Feb. 1, 1938 |
| 2,130,611 | Burdick | Sept. 20, 1938 |
| 2,114,858 | Rosch | Apr. 19, 1938 |
| 2,219,761 | Burdick | Oct. 29, 1940 |
| 2,329,001 | Robinson | Sept. 7, 1943 |
| 2,398,997 | Berry | Apr. 23, 1946 |